Nov. 10, 1959    W. C. MARTIN, JR    2,912,106
MAGNETIC SEPARATOR

Filed Sept. 11, 1956    4 Sheets-Sheet 1

INVENTOR.
WILLIAM C. MARTIN, JR
BY Pyle and Fisher
ATTORNEYS

Nov. 10, 1959  W. C. MARTIN, JR  2,912,106
MAGNETIC SEPARATOR

Filed Sept. 11, 1956  4 Sheets-Sheet 2

INVENTOR.
WILLIAM C. MARTIN, JR
BY Pyle and Fisher
ATTORNEYS

Nov. 10, 1959 W. C. MARTIN, JR 2,912,106
MAGNETIC SEPARATOR
Filed Sept. 11, 1956 4 Sheets-Sheet 3
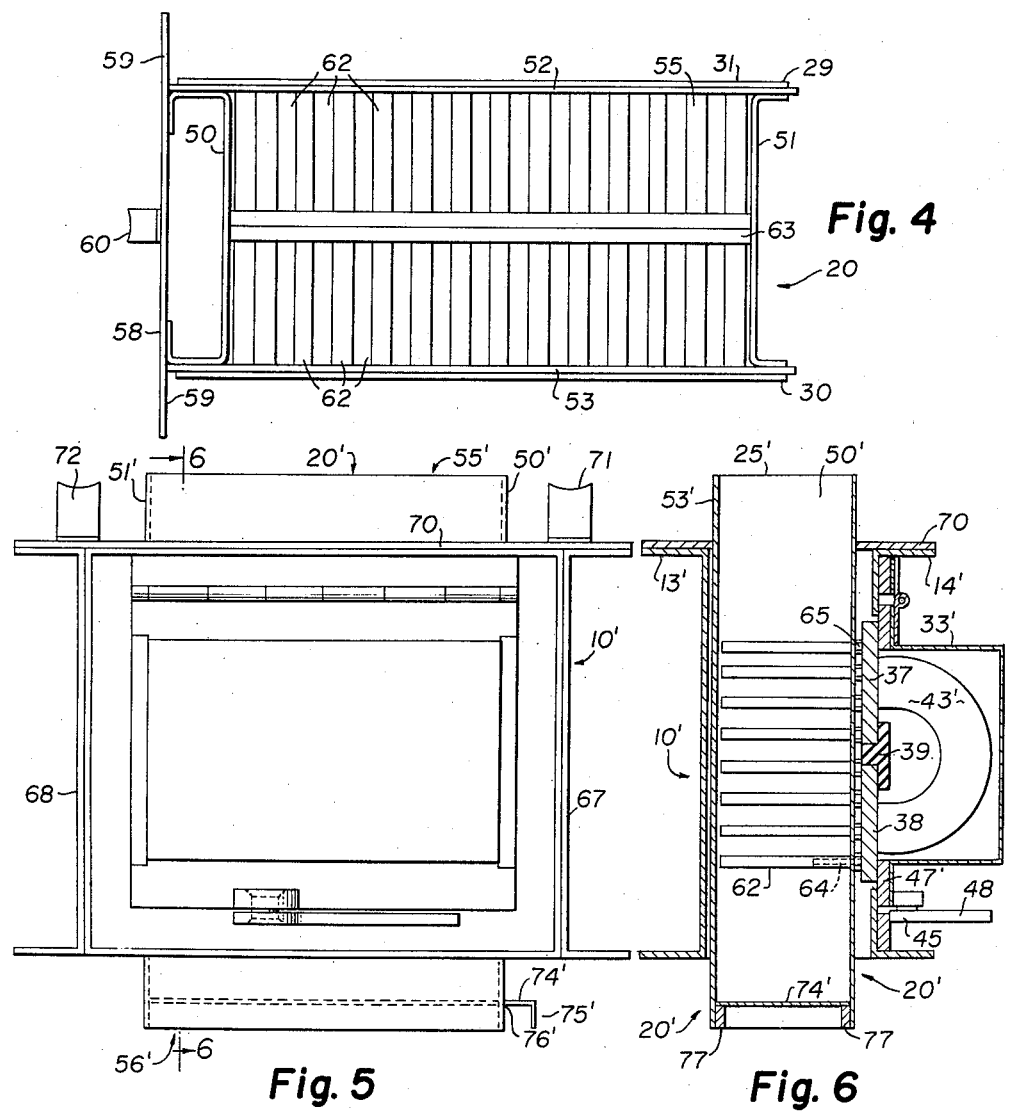
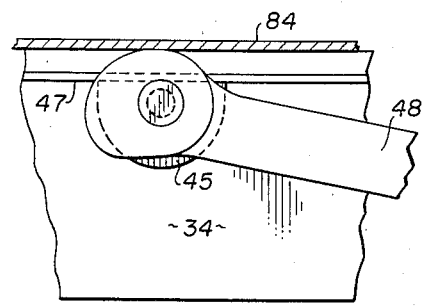
INVENTOR.
WILLIAM C. MARTIN, JR
BY Pyle and Fisher
ATTORNEYS Nov. 10, 1959   W. C. MARTIN, JR   2,912,106
MAGNETIC SEPARATOR
Filed Sept. 11, 1956   4 Sheets-Sheet 4
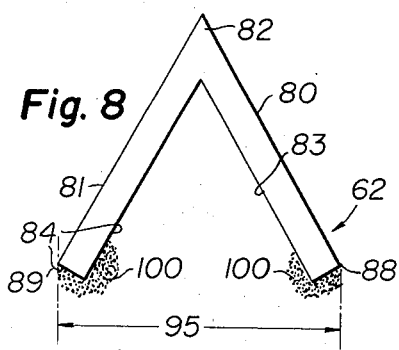
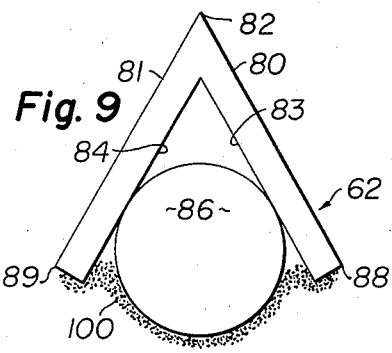
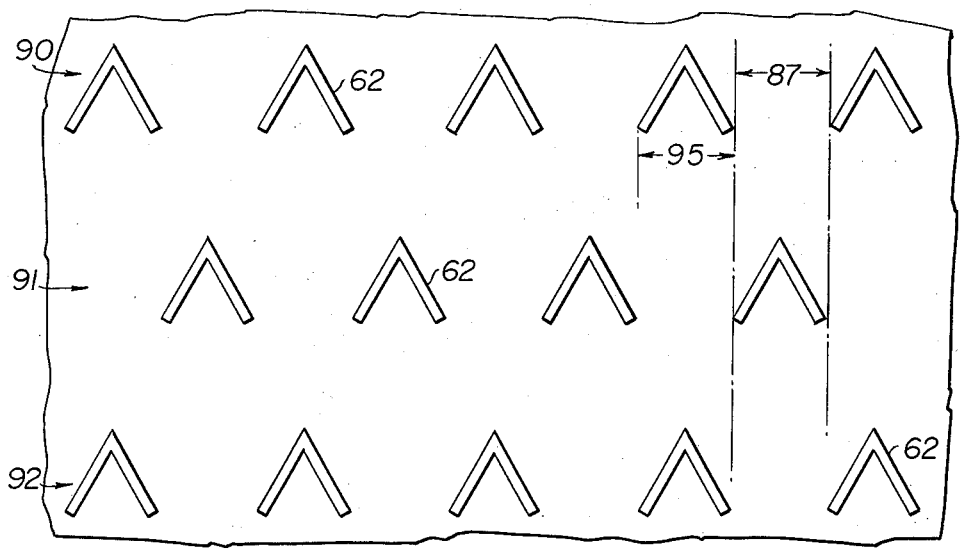
Fig. 10
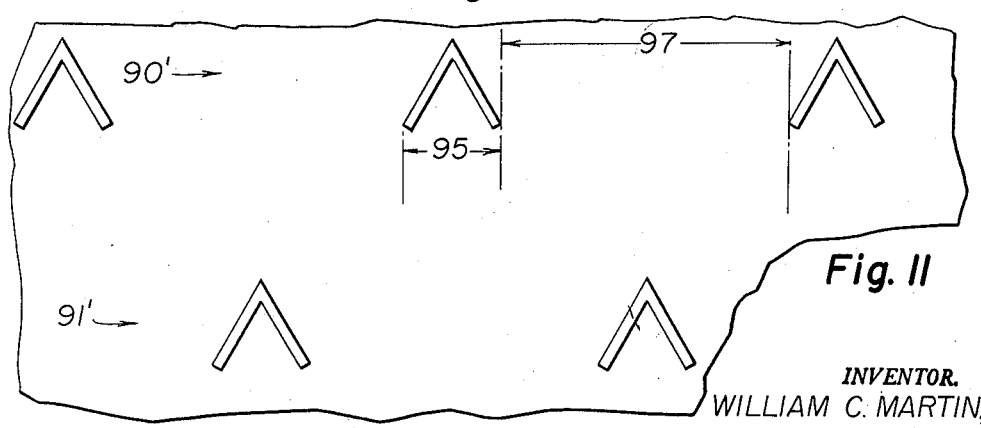
Fig. 11
INVENTOR.
WILLIAM C. MARTIN, JR
BY Pyle and Fisher
ATTORNEYS

United States Patent Office 2,912,106
Patented Nov. 10, 1959

2,912,106

MAGNETIC SEPARATOR

William C. Martin, Jr., Wooster, Ohio, assignor to Magni-Power Company, Wooster, Ohio, a corporation of Ohio Application September 11, 1956, Serial No. 609,148

10 Claims. (Cl. 209—223)

This invention pertains to magnetic separation of contaminating material and more particularly to apparatus for the magnetic separation of particles of magnetic material from fluids or materials of small particle size such as sand and ceramic clay.

Frequent attempts have been made to perfect magnetic separators which seek either to minimize the hindrance of material flow or to maximize the separation of contaminates. It has been discovered that it is possible to construct a separator which has excellent performance characteristics with respect to both high material flow and high separation efficiency.

Accordingly, one of the principal objects of this invention is to provide a separator which will remove substantially all magnetic contaminates from a material flowing through the separator at a very high rate of fluid flow.

The foregoing objective is achieved by providing improved magnetic collection prongs arranged in spaced relationship in spaced rows. The prongs are arranged to minimize turbulence created by the prongs and at the same time to utilize this turbulence as an aid in collection of foregn materials. The turbulence is relied upon the divert the material from one prong to another to assure collection of the contaminates.

It has also been discovered that if a magnetic prong is formed in the shape of an inverted V in cross-section amazing results are obtianed. The V construction provides both smooth surfaces to minimize restriction of fluid flow and a sheltered collection region underneath the prong.

Thus, a further object of the invention is to provide an improved collection prong which will both minimize interruption of flow and remove collected contaminates from such flow to prevent collected contaminates from being knocked from the prongs by a continuing flow of material.

Another and more special object of the intervention is to provide an improved collection prong having a collection bar on the under side of the prong to draw contaminates completely out of the flow of material.

Still another more special object of the invention is to provide an improved collection prong in the shape of an inverted V having a stud fixed to one end for connection of the prong to a support plate and for direct contact with a magnet to conduct a high induced magnetism.

In prior separators extreme difficulty has been encountered in cleaning the separator. When induced magnetism is removed from collection surfaces magnetic material tends to drop through outlet openings into an outlet conduit or drop into other positions. Such material may subsequently be picked up by and contaminate a flow of material which has passed through the separation or scavenging region. Further difficulty has often been experienced in cleaning magnetic separators in that it is difficult to remove all the collected contaminates from collection surfaces and from various nooks and crannies in the interior of the separator unit.

These previous cleaning difficulties have been overcome by the present invention which provides an improved apparatus for magnetic separation and disposal of separated contaminates. In the improved device a collection assembly is removably carried by a housing. A means is provided to close off the assembly outlet opening and a mechanism is provided to selectively induce or terminate magnetism in the collection assembly.

Accordingly, a further principal object of the invention is to provide for cleaning of a magnetic separator by closing the collection assembly outlet opening, removing the magnetic influence and then removing and cleaning the assembly.

An additional object of the invention is to provide an improved apparatus for accomplishing the foregoing method of magnetic separation.

A further object of the invention is to provide such an improved apparatus for cleaning wherein the assembly is a slide-drawer assembly for facile insertion and removal.

Still another and more special object of the invention is to provide a device in which the removable assembly is a compacted light-weight assembly which may be readily lifted vertically from the housing for cleaning.

Still another object of the invention is to provide a removable assembly having at least one magnetic side wall for conduction of an induced magnetism and for carriage of a plurality of collection prongs.

Still another object of the invention is to provide a construction in which magnets may be readily brought into or removed from magnetic contact with collection surfaces to selectively induce magnetism in such surfaces.

This objective is achieved by supporting the magnet on a hinge and by providing a cam and lever device to break magnetic contact of the magnet and collection surfaces. The object is further facilitated by providing an overhead hinge support and so locating the magnets that when the cam action is released the weight of the magnets will cause them to pivot into magnetic contact with the collection prongs and the force of the magnets along with this weight placement will hold them in the desired position for magnetic contact.

Further objects and a fuller understanding of the invention may be had by referring to the following description and claims, taken in conjunction with the accompanying drawing in which:

Figure 4 is a top plan view of a slide drawer removable assembly;

Figure 5 is a side elevational view of a somewhat modified form of construction in which the removable assembly is a lift-out assembly;

Figure 6 is a sectional view as seen from the plane indicated by the line 6—6 of Figure 5 showing the details of the lift-out assembly, a single bank of collection prongs and collection prongs which are mounted through the use of studs fixed to one end;

Figure 7 is a plan view of one of the cams, a foreshortened view of the handle, and a fragmentary view, partly in section, of portions of the housing;

Figure 8 is an end elevational view of an improved collection prong;

Figure 9 is an end elevational view of an improved collection prong which has a collection bar provided;

Figure 10 is a fragmentary end elevational view showing a closely spaced group of collection prongs; and, Figure 11 is a fragmentary end elevational view showing a group of widely spaced collection prongs.

Figure 1:
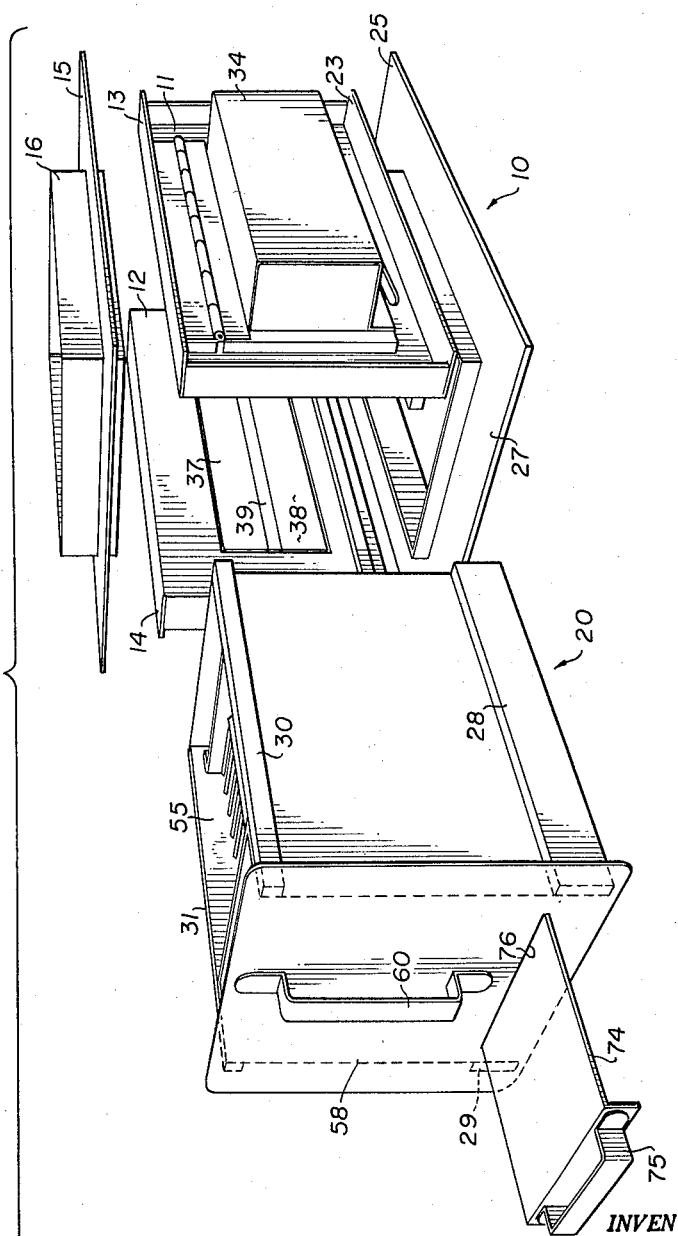
Figure 1 is an exploded perspective view of the preferred form of the improved magnetic separator.

Referring to the drawings, a housing is shown generally at 10. The housing 10 may best be seen in Figure 1 where it is shown in an exploded view. A removable collection assembly is shown generally at 20. In Figure 1 the collection assembly is shown as a slide drawer assembly in position for insertion in the housing 10.

The housing 10 has side supports 11, 12. A portion of each of the side supports 11, 12 is bent outwardly to form top connection extensions 13, 14. A preferably rectangular top plate 15 is fixed to the top connection extensions 13, 14. The top plate 15 carries an inlet duct 16 which serves to guide material into a separation region in the collection assembly 20.

The side supports 11, 12 have bottom connection extensions 23, 24, which are rolled outwardly like the top connection extensions 13, 14. A bottom plate 25 is securely fixed to the bottom extensions 23, 24. The bottom plate 25 carries an outlet duct 26. Thus, the side supports 12, 13 and the top and bottom plate 15, 25 are fixed together to form a rigid support housing. This support housing receives the removable assembly 20.

In its preferred form the assembly 20 is a slide drawer unit. Slide supports 28, 29 are fixed to the base of the assembly 20. These supports 28, 29 slide along inner face 27 of the bottom plate 25 when the assembly is inserted in or removed from the housing 10. Slide guides 30, 31 are carried near the top of the assembly 20. These slide guides 30, 31 hold the assembly in appropriate transverse relationship with the side supports 11, 12.

Figure 3:
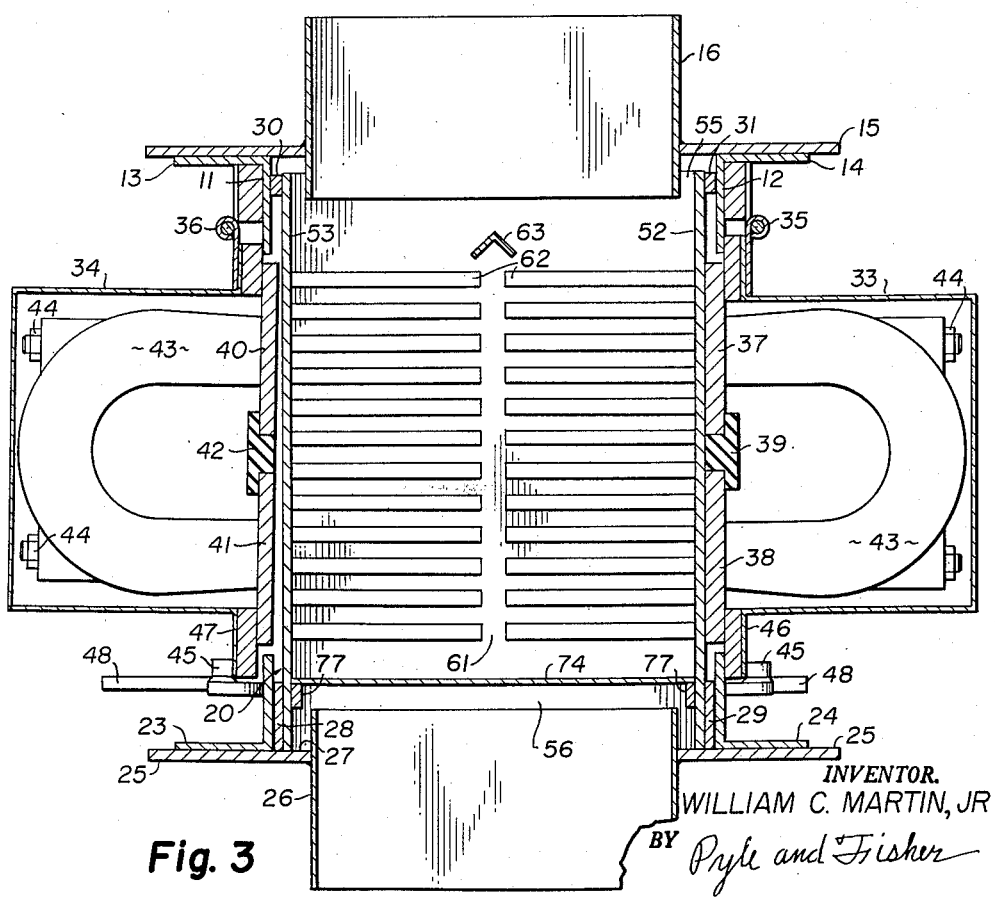
Figure 3 is a sectional view as seen from the plane indicated by the line 3—3 of Figure 2.

As may best be seen in Figure 3, magnet carriages 33, 34 are provided. The magnet carriage 33 is supported by hinge 35 which is fixed to the side support 12. The magnet carriage 34 is supported by hinge 36 which is fixed to the side support 11. A pair of magnetic flux conduction plates 37, 38 are fixed to and form a part of the magnet carriage 33. An insulation bar 39 is interposed between the flux conduction plates 37, 38. The flux conduction plates 37, 38 are formed of a material which is capable of carrying an induced magnetism such as a magnetic stainless steel. The insulating bar 39 is insulating in the sense that it will not carry magnetic flux and it may be formed of a non-magnetic stainless steel. Corresponding magnetic flux conduction plates 40, 41 and an insulating bar 42 are carried by and form a part of the magnet carriage 34.

Magnets which preferably take the form of permanent horseshoe magnets 43 are provided. The magnets 43 are suitably fixed to the flux conduction plates 37, 38 and the flux conduction plates 40, 41. The preferred and disclosed form of connection is through studs 44.

Cams 45 are provided. One cam is fixed to lower portion 46 of the magnet carriage 33. Another cam 45 is fixed to lower portion 47 of the magnet carriage 34. A lever handle 48 is fixed to each of the cams 45. When the cam handle 48 is pivoted outwardly to the position shown in Figure 3 in connection with the magnet carriage 34, the magnet interacts with the housing 10 to pivot the carriage 34 outwardly. When the handle 48 is pivoted to the position shown in connection with the magnet carriage 33 in Figure 3 the weight distribution of the carriage 33 and the magnet 43 will cause the carriage to pivot inwardly until the flux conduction plates 37, 38 contact the removable assembly 20. The magnet is then in a position to induce magnetism in the collection assembly. The magnet's own power is relied upon to assure a tight magnetic flux conducting connection between the conduction plates 37, 38 and the housing 20 and between the conduction plates 40, 41 and the housing 20.

As may best be seen in Figure 4, the assembly 20 has front and back end walls 50, 51. The assembly also has spaced side walls 52, 53. The walls 50, 51, 52, 53, together define a generally rectangular, through passage. The passage has an inlet opening 55, and an outlet opening 56.

A handle plate 58 is fixed to and forms part of the assembly 20. The handle plate has a laterally extending flange 59 which will strike the housing 10 to index inserting movement when the collection assembly 20 is placed in the housing 10. A handle 60 is fixed to the handle plate 58 to facilitate removal of the assembly 20.

In the embodiment of Figures 1 through 4 two banks of collection prongs 62 are provided. As will subsequently be described in more detail, these banks are formed by affixing a plurality of prongs 62 to the side walls 52, 53. The side walls which carry the prongs are, of course, formed of nonmagnetic material. The prongs are of magnetic material. The prongs affixed to side walls 52 comprise one bank and the prongs affixed to side walls 53 comprise the other bank. The prongs of each bank are arranged to provide rows of prongs in longitudinally spaced relationship. The prongs are also arranged to provide vertical spacing between the rows. To prevent magnetic power from being bled from one bank of prongs 62 by the other bank an air space 61, Figure 3, is provided. A baffle 63 extends longitudinally from the front wall 50 to the rear wall 51. The baffle prevents material from descending directly through the air space 61.

In Figures 5 and 6 a slightly modified form of construction is disclosed. This modified construction employs the same basic inventive features. In this modified construction front and back braces 67, 68 form a part of the housing 10'. A removable collection assembly 20' has a transversely extending support flange 70. The support flange 70 extends outwardly to rest on the top connection extensions 13', 14' and on the front and back braces 67, 68. The collection assembly 20' is removed from the housing 10' by grasping handles 71, 72 and lifting the assembly vertically.

In the construction shown in Figures 1 through 4 the prongs 62 are preferably welded to the side walls 52, 53. This construction insures an imperforate fluid tight side wall. In Figure 6 a modified form of prong connection is disclosed. Here studs 64 are fixed to the prongs. The studs project through apertures in the side wall 52'. A nut 65 is threaded on to each of the studs to hold the prongs in fixed position on the side wall 52'. The magnetic conduction plates 37, 38 then contact the studs 64 and the nuts 65 directly. This construction has been found to produce exceptionally strong induced magnetism in the prongs 62.

A catch pan 74 is provided. The catch pan 74 has a handle 75 to facilitate movement of the catch pan 74. The catch pan 74 is used to close off the outlet opening 56. This closing off is accomplished by passing the catch pan 74 through aperture 76 in the handle plate 58. Support bars 77 are carried by the collection assembly 20 at the outlet opening 56. The catch pan 74 rests on these support bars when it is inserted in the collection assembly 20. In the modified construction of Figures 5 and 6 the aperture 76' is provided in the front wall 50'.

In prior magnetic separation mechanisms extreme difficulty has been encountered in properly cleaning separated magnetic contaminates. This difficulty has been completely overcome in the present invention through the provision of the novel removable collection assembly and the improved method of cleaning.

The following description of the method of operation will best be understood by reference to Figures 1 and 3. In operation the cam handles 48, are first pivoted outwardly to cause the cams 45 to interact with the housing 10. This will pivot the magnet carriages 33, 34 outwardly. The collection assembly 20, with the catch pan 74 removed, is then inserted in the housing 10. The collection assembly 20 is slid along slides 28, 29 with the guides 30, 31 aiding in holding the assembly in appropriate spaced relationship with side supports 12, 13. The assembly 20 is shifted longitudinally into the housing until the handle plate flanges 59 strike the side supports 12, 13. The cam handles 48 are next shifted inwardly to permit the magnet carriages 33, 34 to pivot about the hinges 35, 36 respectively. As has previously been explained the weight distribution in the carriages 33, 34 is such that it will cause the carriages to pivot inwardly. The flux conduction plates 37, 38 are brought into contact with the side wall 52, and the flux conduction plates 40, 41 are brought into contact with the side wall 53. With the conduction plates and side walls in such contact, flux is induced in the prongs 62.

Material having magnetic contaminates to be separated is then passed through the collection assembly 20. This passage may be through gravity flow. If it is a gravity flow the material is introduced through the duct 16, thence passed through the inlet opening 55 through the banks of prongs 62 thence out the outlet opening 56 and the outlet duct 26.

After completion of the separation operation and after flow has been stopped the catch pan 74 is passed through the aperture 76 to close the outlet opening 56. The cam handles 48 are then pivoted to break the magnetic flux conduction contact between the flux conduction plates 37, 38 and the side wall 52 and between the flux conduction plates 40, 41 and the side wall 53. As soon as this flux conduction is stopped the induced magnetism in the prongs 62 will disappear. Most of the collected magnetic contaminates will then drop from the prongs but the inserted catch pan will retain such contaminates within the collection assembly 20. The collection assembly 20 is then removed by grasping the handle 60 and pulling it longitudinally, slide-drawer fashion from the housing 10. The collection assembly 20 may then be transported to a suitable location for cleaning. The collection assembly 20 may generally be adequately cleaned by removing the catch pan 74 and shaking the assembly.

One of the outstanding advantages of the invention is achieved through the novel construction of the magnetic prongs 62. The features of these prongs may best be understood by reference to Figures 8 and 9. The prongs have upper or top surfaces 80, 81. These surfaces are smooth surfaces which intersect at an angle of preferably about 60° at an apex 82. The surfaces 80, 81 together define, in cross-section, an inverted V. As contaminated material flows downwardly it strikes these surfaces and the flow is diverted outwardly. Magnetic impurities or contaminates are drawn toward the prong and collected along the surfaces 80, 81. Continuing flow of material tends to wipe these contaminates from the top surfaces 80, 81. In prior constructions magnetic material once scavenged or cleansed from a material to be purified created an extreme problem. This continued flow of materials tended to pick up the scavenged contaminate and carry it once again along with the flow of material being cleansed.

In this present invention this wiping action of the continued flow is utilized to aid in moving the contaminates to a sheltered collection area underneath the prongs 62. This collection area is defined by bottom surfaces 83, 84 in the case of the embodiment of Figure 8. The contaminates are moved down the surfaces 80, 81 and ultimately around bottom corners 88, 89 to the sheltered position as shown by the contaminates indicated at 100. Thus the contaminates are not only separated from the material to be purified but they are also moved out of the path of flow to assure permanent separation.

In the embodiment of Figure 8 a collection bar 86 is provided to aid in holding the contaminates 100 in a trapped position out of material flow. This bar may simply be a rod which extends longitudinally the length of the prong 62. It is fixed to the bottom surfaces 83, 84. The collection bar 86 like the prongs 62 is, of course, formed of a material capable of carrying an induced magnetism.

In Figures 10 and 11 the spacing of magnetic prongs 62 in banks is disclosed in detail. Exceptional results have been obtained through the use of the improved prongs and through the discovery of a spacing arrangement which provides optimum results.

A separator made in accordance with the present teaching has outstanding flow characteristics. For example, in an hour 16 tons of silica sand may be passed through a collection assembly having approximately 70 square inches of horizontal cross-sectional area. If a vibrator is employed to shake the collection assembly this flow can be increased to approximately 24 tons per hour. Even with this exceptionally high volume of material flow exceptional collection performance is obtained.

The assembly has proved outstanding in cleansing clay for the manufacture of white porcelain electric insulators, for example. The conditions encountered in magnetic separation for such white insulators are extreme. The clay used often has a high moisture content and it tends to pack and clog a separator unless the separator has outstanding material flow characteristics. On the other hand, the clay must be thoroughly cleansed of contaminates since each tiny speck of ferrous material which is not removed from such clay will produce a black blemish in a finished insulator. Thus, a separator for the manufacture of porcelain insulators must be outstanding in both flow and collection characteristics. A separator made in accordance with the present teaching achieves this result.

Figure 2:
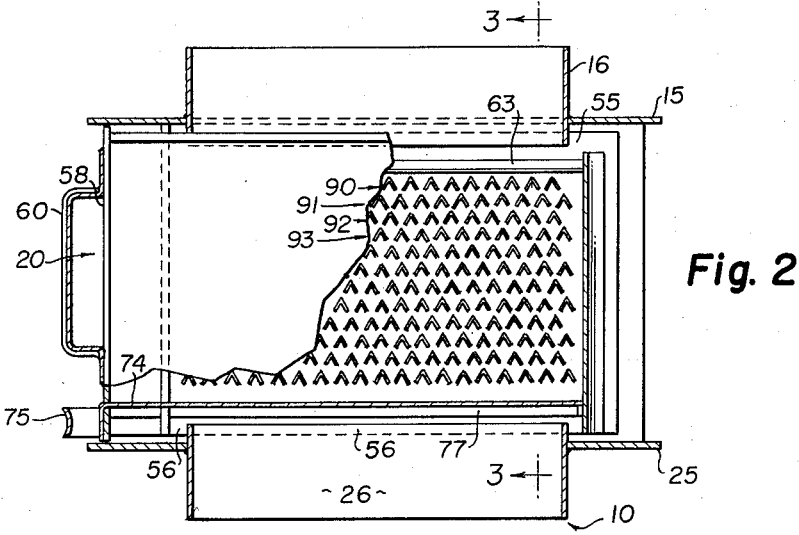
Figure 2 is a side elevational view of the improved separation device with parts broken away and removed.

Referring to Figure 10 a part of a bank of prongs is shown in side elevation. The prongs are arranged in horizontal rows indicated by the numbers 90, 91, 92 and 93 (Figure 2). It will be apparent that any number of rows may be provided and the rows may be of any longitudinal extent. In the first or top row 90, a plurality of spaces 87 are defined by the bottom edges or horizontal extremities 88, 89. The prongs of the second row 91 are located centrally and immediately below each of the spaces 87. In the embodiment of Figure 10 the width, indicated at 95 in Figure 8, of each of the prongs 62 is substantially equal to the width of each of the spaces 87. Thus a particle descending vertically through the device of Figure 10 must strike a prong in one of the first two rows. After it has once struck a prong it is diverted to a prong in the next row. The prongs of the third row 92, and subsequent alternate rows, are spaced immediately below the prongs of the top row 90. The prongs of the fourth row 93 and subsequent alternate rows are spaced immediately below the prongs of the second row 91. Thus, in the embodiment of Figure 10 a vertically descending particle will strike a prong in either the first or second row 90, 91 and thereafter a prong in each succeeding row.

In Figure 11 the prongs are more widely spaced. Here the tendency of flowing material to cause adjacent material to be diverted by the action of the prongs is utilized to assure complete separation of contaminates. In Figure 11 the width 95 of the prongs is approximately one-third of the width of the spaces 97.

The limits of optimum prong spacing are believed to be represented by the disclosures of Figures 10 and 11. If the prongs of Figure 10 are moved more closely together undue clogging and interference with fluid flow generally results. Thus the inner limit of prong spacing appears to be at the point where the prongs of second and alternate succeeding rows have bottom extremities 88, 89 which are located substantially in a plane common to the extremities of the prongs of the first, 90, the third, 92, and alternate succeeding rows.

If the prongs are more widely spaced than Figure 11 collection efficiency decreases. Thus the maximum spacing appears to be where the width of the prongs 62 is equal to about one-third of the width of the spaces 97.

There has thus been described an improved magnetic separator in which fluid flow, collection of contaminates, and separator cleansing characteristics have all been improved. There has also been described an improved method of separating of magnetic contaminates from a non-magnetic material.

Although the invention has been described in its preferred form with a certain degree of particularity it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A magnetic separator comprising a housing, a removable slide drawer assembly carried in the housing, the assembly having first and second end walls and first and second side walls defining a generally rectangular tube having a top inlet opening and a bottom outlet opening, said assembly having a plurality of prongs fixed to each of the side walls, each of the prongs being capable of carrying an induced magnetism, the prongs being of V-shaped transverse cross-section, each of such V-shaped prongs having an upwardly directed apex, a catch pan, one of the walls having a longitudinal slot formed therein, the catch pan being insertable through the slot to close the bottom opening, said drawer assembly including slide means to slidably engage the housing to permit the drawer to be moved longitudinally into and out of the housing, first and second magnets hinged to the housing, the first magnet being selectively engageable with the first side wall, the second magnet being selectively engageable with the second side wall, first and second cams, the first cam being carried by the separator for interaction with the first magnet, the second cam being carried by the separator for interaction with the second magnet, and first and second handles, the first handle being fixed to the first cam and the second handle being fixed to the second cam whereby to provide a separating device through which material may be passed for separation of contaminating magnetic materials and a device which may be cleaned by insertion of the catch pan, rotation of the cams to separate the magnets from the assembly side walls, and sliding removal of the drawer assembly with separated contaminating material contained therein.

2. A magnetic separator comprising a housing, a removable slide drawer assembly carried in the housing, the assembly having first and second end walls and first and second side walls defining a generally rectangular tube having a top inlet opening and a bottom outlet opening, said assembly having a plurality of prongs fixed to each of the side walls, each of the prongs being capable of carrying an induced magnetism, the prongs being of V-shaped transverse cross-section, each of such V-shaped prongs having an upwardly directed apex, said assembly walls defining a through passage, said assembly including baffles, the baffles and the prongs together extending over substantially the entire cross-sectional area of the passage so that a vertical path through the passage is a tortuous path, a catch pan, one of the walls having a longitudinal slot formed therein, the catch pan being insertable through the slot to close the bottom opening, said drawer assembly including slide means to slidably engage the housing to permit the drawer to be moved longitudinally into and out of the housing, first and second magnets hinged to the housing, the first magnet being selectively engageable with the first side wall, the second magnet being selectively engageable with the second side wall, first and second cams, the first cam being carried by the separator for interaction with the first magnet, the second cam being carried by the separator for interaction with the second magnet, and first and second handles, the first handle being fixed to the first cam and the second handle being fixed to the second cam whereby to provide a separating device through which material may be passed for separation of contaminating magnetic materials and a device which may be cleaned by insertion of the catch pan, rotation of the cams to separate the magnets from the assembly side walls, and sliding removal of the drawer assembly with separated contaminating material contained therein.

3. A magnetic separator assembly comprising, a member having side walls defining a rectangular passage open at the top and the bottom, at least two rows of collection prongs fixed to one of the side walls, each of said prongs being an elongated one piece member of a material capable of carrying an induced magnetism, such two rows being top and bottom rows, each of said rows having a plurality of spaced prongs, each of such prongs having first and second top surfaces forming in cross-section an inverted V, the prongs of said first row defining a space between each adjacent pair of prongs, one of the prongs in said second row being immediately below each such space between two prongs of said first row and substantially equally spaced from such two prongs, the prongs being of sufficient width and length so that a vertical path is a tortuous path, a frame structure housing and supporting said member, at least one magnet hinged to one side of said frame and selectively abutable against said one side wall to induce magnetism in said prongs.

4. A magnetic separator assembly comprising, a member having side walls defining a rectangular passage open at the top and the bottom, at least two rows of collection prongs fixed to one of the side walls, each of said prongs being an elongated one piece member of a material capable of carrying an induced magnetism, such two rows being top and bottom rows, each of said rows having a plurality of spaced prongs, each of said prongs having at least one surface which is vertically oblique, said prongs each having first and second parallel side extremities, the top row prong extremities of adjacent prongs defining a space between each pair of adjacent prongs, the bottom row prongs being arranged to provide one prong beneath each space defined by adjacent top row prong extremities, each of said bottom row prongs being substantially equally spaced from two adjacent top row prongs, each bottom row prong having a width equal to from about one-third to one times the width of each of such top row spaces, a frame structure housing and supporting said member, at least one magnet hinged to one side of said frame and selectively abutable against said one side wall to induce magnetism in said prongs.

5. A magnetic separator comprising, a collection assembly having a plurality of side walls defining a member of substantially rectangular cross section; the member having a top inlet opening, a bottom outlet opening, and a through collection passage therebetween; a housing having an assembly support means and an assembly receiving space open at the top and at the bottom, the assembly being removably positionable on the assembly support means and at least partially within said space, the housing including guide means to align the assembly in said space with the member inlet and outlet openings aligned with the housing top and bottom openings when the assembly is positioned on the assembly support means, the assembly including a plurality of magnetic prongs fixed to at least one of said side walls, at least one magnet carried by the housing along one side thereof, the magnet being shiftable selectively to an operation position and an assembly removal position, the magnet being in magnetic field inducing contact with said prongs when in said operation position and the assembly is positioned on the assembly support means, and means to shift the magnet from the operation position to the assembly release position.

6. A magnetic separator comprising, a collection assembly having a plurality of side walls defining a member of substantially rectangular cross section; the member having a top inlet opening, a bottom outlet opening, and a through collection passage therebetween; a housing having an assembly support means and an assembly receiving space open at the top and at the bottom, the assembly being removably positionable on the assembly support means and at least partially within said space, the housing including guide means to align the assembly in said space with the member inlet and outlet openings aligned with the housing top and bottom openings when the assembly is positioned on the assembly support means, the assembly including a plurality of magnetic prongs fixed to at least one of said side walls, a pair of magnets carried by the housing along opposite sides thereof, the magnets each being shiftable selectively to an operation position and an assembly removal position, each of the magnets being in magnetic field inducing contact with said prongs when in said operation position and the assembly is positioned on the assembly support means, and means to shift each of the magnets from the operation position to the assembly release position.

7. The device of claim 5 wherein the means to shift the magnet is a cam pivotally mounted on the housing and coactable with the magnet.

8. A magnetic separator comprising, a collection assembly having a plurality of side walls defining a member cross section; the member having a top inlet opening, a bottom outlet opening, and a through collection passage therebetween; a housing having an assembly receiving space open at the top and the bottom, the housing including slide means disposed horizontally along opposite sides of said space, the assembly including cooperating means coactable with the slide means to support the assembly selectively and removably on the housing and to guide the assembly in selective rectilinear movement along said slide means into and out of said space, said cooperating and slide means also providing a guide to align the member inlet and outlet openings with the housing top and bottom openings when the assembly is selectively positioned in said space, the assembly including a plurality of magnetic prongs fixed to at least one of said side walls, at least one magnet carried by the housing along one side thereof, the magnet being shiftable selectively to an operation position and an assembly removal position, the magnet being in magnetic field inducing contact with said prongs when in said operation position and the assembly is positioned on the assembly support means, and means to shift the magnet from the operation position to the assembly release position.

9. The device of claim 5 wherein the assembly includes laterally extending flange means positionable on the assembly support means to support the assembly, and wherein the assembly projects through the housing top opening when the assembly is supported by the flange means resting on the assembly support means.

10. The device of claim 5 wherein a catch pan is selectively insertable in the assembly near the bottom outlet and across the member passage.

References Cited in the file of this patent

UNITED STATES PATENTS

| | | |
|---|---|---|
| 79,849 | Meyer | July 14, 1868 |
| 384,035 | Hamilton | June 5, 1888 |
| 738,331 | Lancaster | Sept. 8, 1903 |
| 1,425,235 | Bradley | Aug. 8, 1922 |
| 1,466,310 | Mann | Aug. 28, 1923 |
| 2,331,769 | Frantz | Oct. 12, 1943 |
| 2,792,115 | Medearis | May 14, 1957 |
| 2,834,359 | Kearney | May 13, 1958 |

FOREIGN PATENTS

| | | |
|---|---|---|
| 643,237 | France | Oct. 29, 1927 |
| 870,532 | Germany | Mar. 6, 1953 |
| 748,855 | Great Britain | May 9, 1956 |